Figure 1:
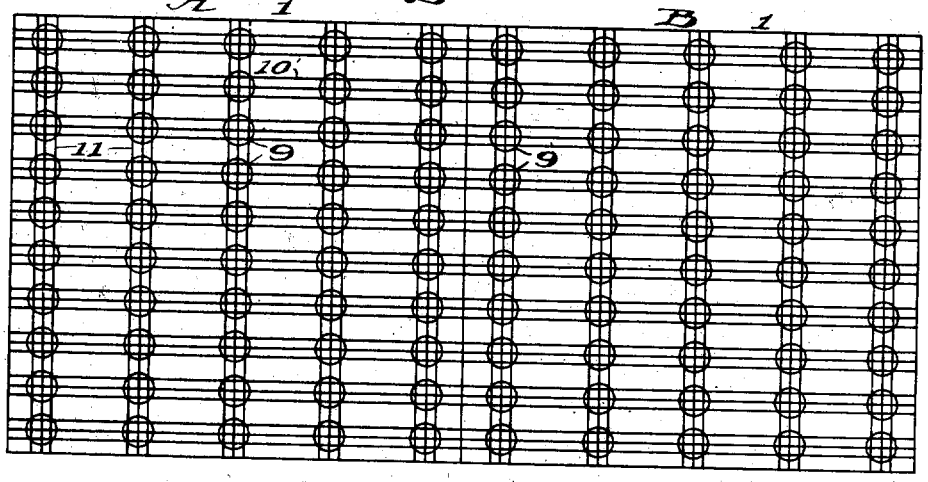

No. 12,768. REISSUED MAR. 24, 1908.

H. W. PENNEPACKER.

BED SPRING.

APPLICATION FILED NOV. 2, 1907.

2 SHEETS—SHEET 1.

WITNESSES

Walter Samariss

O. L. Thompson.

INVENTOR

Harry W. Pennepacker

By J. N. Cooke

Attorney.

No. 12,768. REISSUED MAR. 24, 1908.

H. W. PENNEPACKER.

BED SPRING.

APPLICATION FILED NOV. 2, 1907.

2 SHEETS—SHEET 2.

WITNESSES

Walter Samariss

O. L. Thompson.

INVENTOR

Harry W. Pennepacker

By J. N. Cooke

Attorney.

UNITED STATES PATENT OFFICE.

HARRY W. PENNEPACKER, OF ALLEGHENY, PENNSYLVANIA, ASSIGNOR TO FORT PITT BEDDING COMPANY, OF ALLEGHENY, PENNSYLVANIA, A CORPORATION OF PENNSYLVANIA.

BED-SPRING.

No. 12,768. Specification of Reissued Letters Patent. Reissued Mar. 24, 1908.

Original No. 819,671, dated May 1, 1906, Serial No. 282,782. Application for reissue filed November 2, 1907. Serial No. 400,423.

*To all whom it may concern:*

Be it known that I, HARRY W. PENNEPACKER, a citizen of the United States of America, residing at Allegheny, in the county of Allegheny and State of Pennsylvania, have invented certain new and useful Improvements in Bed-Springs, of which the following is a specification, reference being had therein to the accompanying drawings.

This invention relates to certain new and useful improvements in bed-springs, and relates more particularly to that type of spring known as a "folding bed-spring".

The primary object of this invention is to provide a folding bed-spring that can be readily used in connection with iron and wooden bedsteads.

Another object of this invention is to provide a spring of the above type wherein novel means is employed for insuring a rigid connection between the various parts of the spring, and in this connection I have devised a novel way of weaving the various wires of the spring to firmly retain the weight-sustaining springs in position. To this end I have devised a spring that can be readily mounted upon a wooden bed as well as an iron bed; but in using it in connection with an iron bed I dispense with the wooden slats heretofore used for supporting the same, these slats being an expensive and troublesome element in iron beds. I have also devised other novel features of construction which would provide a strong and durable bed-spring that can be manufactured at a comparatively small cost.

With the above and other objects in view, which will more clearly appear as the nature of the invention is better understood, the same consists in the novel construction, combination, and arrangement of parts to be hereinafter more fully described and then specifically pointed out in the claims, and referring to the drawings accompanying this application like characters of reference designate corresponding parts throughout the sveral views, in which—

Figure 2:
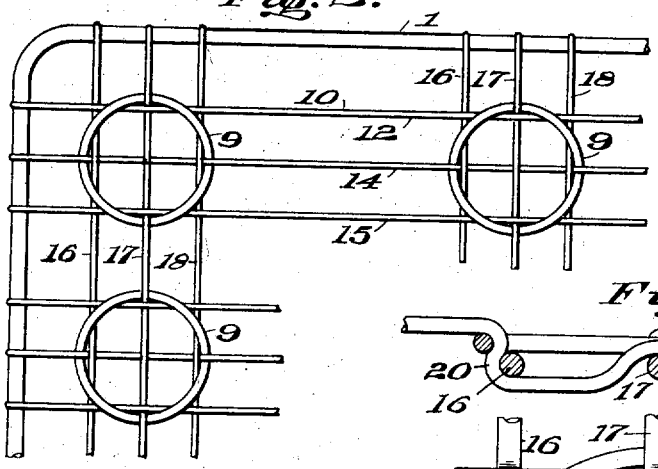
Figure 3:
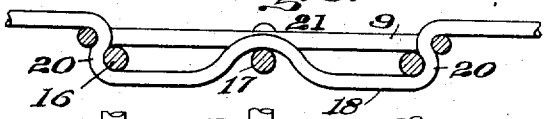
Figure 5:
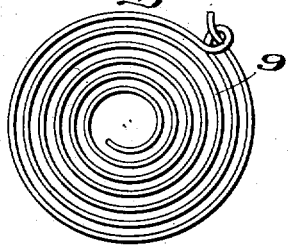
Figure 4:
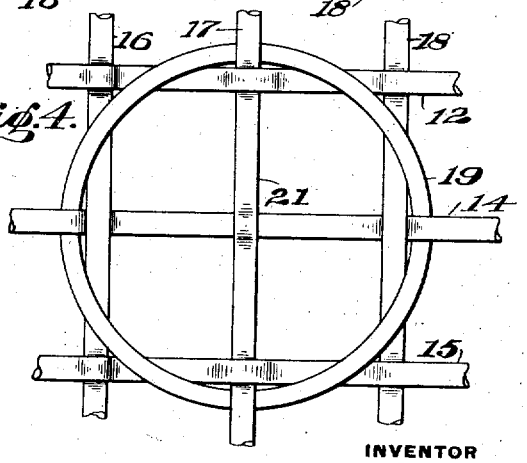
Figure 6:
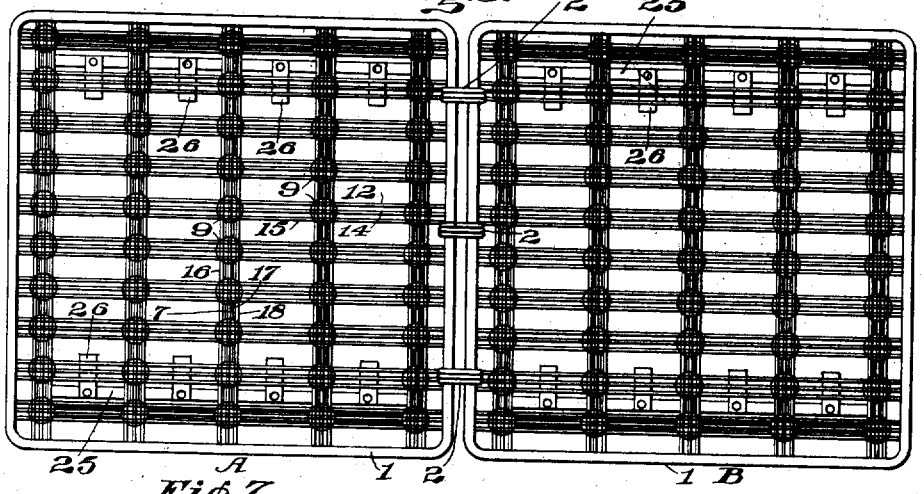
Figure 7:
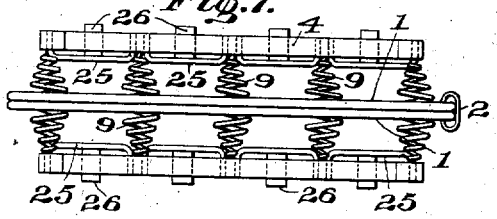
Figure 10:
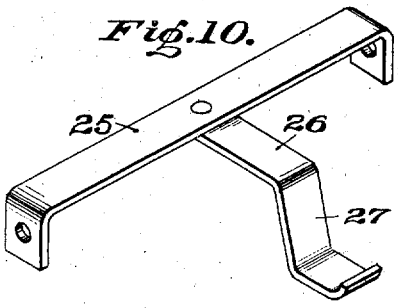
Figure 8:
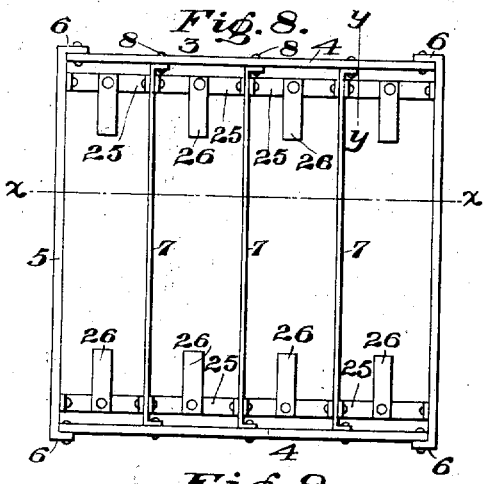
Figure 11:
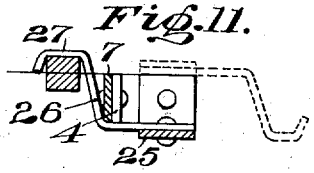
Figure 12:
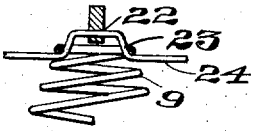
Figure 9:
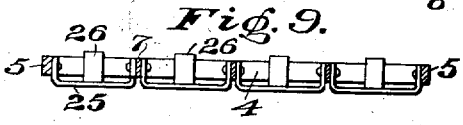

Figure 1 is a diagrammatic plan of my improved spring. Fig. 2 is a detail plan of one corner of the spring. Fig. 3 is a detail sectional view illustrating the manner of forming a rigid connection between the framework of the spring and the weight-sustaining springs thereof. Fig. 4 is a plan view of the same. Fig. 5 is a plan view of one of the weight-sustaining springs. Fig. 6 is a plan view of my improved spring in open position. Fig. 7 is a side elevation of the same in a closed psoition. Fig. 8 is a bottom plan of part of the spring-frame. Fig. 9 is a cross-sectional view taken on the line $x\,x$ of Fig. 8. Fig. 10 is a detail perspective view of the supporting member used in connection with the spring. Fig. 11 is a cross-sectional view taken on the line $y\,y$ of Fig. 8. Fig. 12 is a detail sectional view of one of the transverse slats of the bed-spring frame, illustrating the manner of securing one of the weight-sustaining springs thereto.

To put my invention into practice, I construct my improved spring of two sections A and B, and the top of each section is formed by a metallic rectangular frame 1, these frames being connected together by hinges 2 2 2. The sections A and B when in an open position, as illustrated in Figs. 1 and 6, are adapted to fit upon an iron or wooden bedstead and when closed, as illustrated in Fig. 7 of the drawings, to form a compact and easily-handled structure.

The sections A and B are identical in construction, and in order that the invention may be clearly understood and for the sake of brevity I deem it only necessary to describe one of said sections.

In connection with the rectangular frame 1, which forms the top of the spring, I employ a rectangular frame 3, forming the bottom of the spring. This frame, which is of less area than the top frame 1, comprises side rails 4 4 and end rails 5 5, the ends of said rails being conveniently secured together, as at 6. The side rails 4 4 are clamped together and braced by transversely-disposed metallic slats 7 7, the ends of said slats being riveted, as at 8, to the side rails or otherwise secured by conventional means.

The top rectangular frame 1 and the bottom rectangular frame 3 are connected together by a plurality of single volute helix or helical springs 9, the ends of said springs being secured to the end rails 5 and the slats 7 of the frame 3, while the opposite ends of said springs are supported by interwoven wires carried by the frame 1. The springs 9 are arranged in transversely-disposed rows, the springs of each row being equally spaced apart and the rows relative to one another being equally spaced apart. The large ends of the springs are held by the rectangular frame 1 by employing longitudinally-disposed wires 10 and transversely-disposed wires 11, said wires being woven together and having their ends secured to the rectangular frame 1. The manner of weaving the wires 10 and 11 together to hold the large end of the springs 9 is clearly illustrated in Figs. 2 to 4, inclusive, of the drawings. Three longitudinally-disposed wires 12, 14, and 15 are employed, also three transversely-disposed wires, 16, 17, and 18. The center wires 17 and 14 of the sets of wires 10 and 11 pass over the top convolutions 19 of the springs 9. These wires are bent downwardly, as at 20 20, to pass under the transverse wires 16 and 18 and the longitudinal wires 12 and 15. The center wires 14 and 17 cross one another, as at 21, the center wire 17 being bent upwardly to pass over the center wire 14. The wires 12 and 15 pass over the wires 16 and 18, downwardly under the convolutions 19, and over the center wire 17. The wires 16 and 18 pass under the wires 12 and 15, under the convolutions 19, and over the center wire 14. By weaving the wires in this manner the convolutions 14 are locked at four diametrically-opposed points, and as the ends of the sets of wires 10 and 11 are secured to the frame 1 the convolution 19 of each spring will be normally held in horizontal alinement with the frame 1. By bending various wires of each set the convolution 19 of each spring will be prevented from becoming displaced or sliding upon the wires, as has been experienced when the wires were simply passed in and over the convolution. The shoulders formed by bending the wires, as at 20, prevent the spring from being laterally displaced or moved laterally with respect to the sets of wires 10 and 11.

To secure the smaller ends of the springs 9 to the end rails 5 5 and the slats 7 7, the slats are provided with apertures 22, these apertures being located in the slats centrally of the smaller convolutions 23 of the springs 9. The convolutions 23 are adapted to bear against the slats 7, and longitudinally-disposed wires 24 are passed under the convolutions and through the openings or apertures 22 of the slats 7, thereby locking the convolutions 23 in engagement with the slats 22, this being clearly illustrated in Fig. 12 of the drawings. It will be observed that the slats 22 serve the same purpose as the transversely-disposed sets of wires 11 of the upper frame 1, and when the springs 9 are locked in engagement with the slats 7 it will be impossible for the smaller convolutions 23 of the springs to become detached or laterally displaced relative to the slats 7.

Reference will now be had to Figs. 6 to 11, inclusive, wherein the application of my improved supporting member of hanger to the sections A and B of the spring is clearly illustrated. Between the end rails 5 5 and the slats 7 are pivotally mounted straps or stirrups 25, these straps or stirrups being arranged in longitudinal alinement with one another adjacent to the side rails 4 4 of the lowermost frame 3. Centrally of each strap is fixed a hanger 26, said hanger having a hook-shaped end 27. In Figs. 8 and 9 the hanger is shown as extending inwardly toward the center of the frame 3, and when in this position the bed-spring can be used in connection with a wooden bed. It will be observed that the hangers extend inwardly between the slats 7 7, and these slats serve to support the spring upon the wooden slats used in connection with a wooden bed.

When the spring is to be used in connection with an iron bed, the hangers 26 are swung outwardly to the position shown in full lines, Fig. 11, this operation being accomplished by simply reverting the straps or stirrups 25. The hook-shaped end 27 of each hanger is adapted to engage over the iron side rails of an iron bed and together with the slats 7 rigidly support the sections A and B upon the bed.

In dispensing with the wooden slats an expensive and troublesome part of the bed is dispensed with, and in supporting my improved spring the slats 7, which are practically formed integral therewith, serve the same function as wooden slats. When the spring is used in connection with an iron bed, the slats 7 will be supported by hangers 26, resting upon the iron side rails of the bed, while the outer ends of the sections A and B, conforming to the head and foot of the spring, will simply be supported by the suspended frames 3 3 of the bed-spring.

When the spring is supported upon a wooden bed the side rails 4 simply rest upon the wooden slats of the bed, the hangers extending inwardly and not interfering with the side rails of the bed.

What I claim, and desire to secure by Letters Patent, is—

1. In a bed-spring, the combination with two rectangular hinged frames, of longitudinally and transversely arranged wires connected to said frames, helical springs supported by said wires, and having their largest convolutions interwoven in said wires, rectangular frames supported by said springs, slats carried by said rectangular frames and connected to said springs, stirrups pivotally mounted between said slats adjacent to the longitudinal edges of said frames, and hangers carried by said stirrups, substantially as described.

2. In a bed-spring, the combination with two rectangular frames hinged together and adapted to fold upon one another, of interwoven wires carried by said frames, springs connected to said wires, transversely-disposed slats carried by said springs, rectangular frames supported by said slats, stirrups pivotally connected to said slats, and hangers connected to said stirrups, substantially as described.

3. In a bed-spring, the combination with two hinged frames, of interwoven wires carried by said frames, springs supported by said wires, slats carried by said springs, rectangular frames carried by said slats, stirrups carried by said slats, hangers connected to said stirrups adjacent to the longitudinal edges of said rectangular frames, and means to prevent lateral displacement of said springs, substantially as described.

4. The combination with a bed, of hinged frames, springs carried by said frames, slats carried by said springs, frames carried by said slats, means carried by said slats adjacent to and within the longitudinal edges of said last-named frames, to support said frames upon said bed, and means to prevent lateral displacement of said springs, substantially as described.

5. A bed-spring of the type described consisting of hinged frames, springs carried by said frames, transversely-disposed slats carried by said springs, stirrups pivotally carried by said slats, and hangers connected to said stirrups, substantially as described.

6. A bed-spring, consisting of a frame, slats disposed transversely of said frame and carried thereby, springs carried by said slats, stirrups pivotally connected to said slats for swinging longitudinally of the slats, and hangers connected to said stirrups.

In testimony whereof I affix my signature in the presence of two witnesses.

HARRY W. PENNEPACKER.

Witnesses:

CHAS. P. TRIMBLE,

WM. F. WEPPNER.